(12) United States Patent
Bricker

(10) Patent No.: US 10,315,723 B2
(45) Date of Patent: Jun. 11, 2019

(54) RACK-DRIVEN SEATED HANDCYCLE

(71) Applicant: Jeremy David Bricker, The Hague (NL)

(72) Inventor: Jeremy David Bricker, The Hague (NL)

(*) Notice: Subject to any disclaimer, the term of this patent is extended or adjusted under 35 U.S.C. 154(b) by 0 days.

(21) Appl. No.: 15/936,292

(22) Filed: Mar. 26, 2018

(65) Prior Publication Data

US 2018/0215443 A1 Aug. 2, 2018

Related U.S. Application Data

(63) Continuation-in-part of application No. PCT/US2016/053499, filed on Sep. 23, 2016.

(60) Provisional application No. 62/232,129, filed on Sep. 24, 2015.

(51) Int. Cl.
| | |
|---|---|
| *B62M 1/16* | (2006.01) |
| *B62K 5/02* | (2013.01) |
| *B62K 21/06* | (2006.01) |
| *B62M 9/06* | (2006.01) |
| *B62M 11/06* | (2006.01) |
| *B62M 17/00* | (2006.01) |
| *B62K 3/00* | (2006.01) |
| *B62K 21/18* | (2006.01) |

(52) U.S. Cl.
CPC ........... *B62M 1/16* (2013.01); *B62K 3/005* (2013.01); *B62K 5/02* (2013.01); *B62K 21/06* (2013.01); *B62K 21/18* (2013.01); *B62M 9/06* (2013.01); *B62M 11/06* (2013.01); *B62M 17/00* (2013.01)

(58) Field of Classification Search
CPC . B62M 1/12; B62M 1/14; B62M 1/16; B62M 1/32; B62K 3/005; A61G 5/02
See application file for complete search history.

(56) References Cited

U.S. PATENT DOCUMENTS

| | | |
|---|---|---|
| 98,092 A | 12/1869 | Neale |
| 3,994,509 A | 11/1976 | Schaeffer |
| 4,456,277 A * | 6/1984 | Carpenter .............. B62K 3/005 180/205.4 |

(Continued)

FOREIGN PATENT DOCUMENTS

| | | | |
|---|---|---|---|
| GB | 2378162 A * | 2/2003 | .............. B62M 1/16 |
| WO | 2012/035459 A2 | 3/2012 | |

*Primary Examiner* — Joseph M Rocca
*Assistant Examiner* — Daniel S Yeagley
(74) *Attorney, Agent, or Firm* — Bycer Law, PLC; Matthew L. Bycer

(57) ABSTRACT

A rack-driven seated handcycle is a semi-recumbent style two, three, or four wheeled human powered cycle that uses a linearly designed toothed rack with teeth located on the topside and bottom side of the rack, and a gear that meshes with the top teeth and a gear that meshes with the bottom teeth, at least one ratchet mechanism, and a chain coupling the upper and lower gears with the drive wheel which may be located in front or back of the rider. The rider pushes and pulls the "handlebars" forward and rearward to pull the rack back and forth in relation to the pinions above and below the toothed rack to drive chain(s) to propel the cycle forward. Each forward and each rearward stroke may constitute a power stroke to propel the cycle. A plurality of gear speeds is able to independently select a lever ratio for each of the forward and the rearward strokes.

25 Claims, 11 Drawing Sheets

(56) References Cited

U.S. PATENT DOCUMENTS

| | | | |
|---|---|---|---|
| 4,541,647 A | | 9/1985 | Braun |
| 4,811,964 A | | 3/1989 | Horn |
| 4,861,055 A | * | 8/1989 | Jones ................. B62M 1/14 |
| | | | 280/234 |
| 5,007,655 A | | 4/1991 | Hanna |
| 5,050,864 A | * | 9/1991 | Pertramer .............. B62K 3/002 |
| | | | 280/245 |
| 5,330,218 A | * | 7/1994 | Escudero ................ B62M 1/16 |
| | | | 280/220 |
| 5,653,663 A | * | 8/1997 | McCahon .............. B62K 3/005 |
| | | | 280/245 |
| 5,762,350 A | * | 6/1998 | Jolly ...................... A61G 5/02 |
| | | | 280/245 |
| 6,331,036 B1 | | 12/2001 | Papac |
| 6,352,274 B1 | | 3/2002 | Redman |
| 6,708,996 B1 | * | 3/2004 | Suptil .................... B62M 1/16 |
| | | | 280/242.1 |
| 6,708,997 B2 | * | 3/2004 | Chait ..................... B62K 3/002 |
| | | | 280/244 |
| 7,938,419 B2 | | 5/2011 | Leslie |
| 7,967,314 B1 | * | 6/2011 | Mirabile ................ B62M 1/16 |
| | | | 280/242.1 |
| 8,985,607 B2 | | 3/2015 | Schminkey |
| 9,051,025 B2 | | 6/2015 | Schminkey |
| 9,290,233 B2 | * | 3/2016 | Goin ....................... B62M 1/32 |
| 9,296,446 B2 | | 3/2016 | Schminkey |
| 2008/0129007 A1 | | 6/2008 | Lee |
| 2011/0248466 A1 | | 10/2011 | Leslie |
| 2014/0306420 A1 | * | 10/2014 | Schminkey ............ B62M 1/16 |
| | | | 280/242.1 |
| 2014/0306421 A1 | | 10/2014 | Schminkey |
| 2014/0306423 A1 | | 10/2014 | Schminkey |

\* cited by examiner

RACK-DRIVEN SEATED HANDCYCLE

CLAIM OF PRIORITY

This application claims priority to U.S. Provisional Patent Application No. 62/232,129 filed Sep. 24, 2015 by Jeremy David Bricker, entitled "Double Rack and Pinion Linear Motion Drive Mechanism for Hand-cycle", and PCT Application No. PCT/US2016/053499 filed Sep. 23, 2016 by Jeremy David Bricker, entitled "Rack-Driven Seated Hand-Cycle".

BACKGROUND OF THE INVENTION

1. Field of the Invention

The present invention relates generally to the field of hand powered cycles and more specifically relates to a rack-driven seated handcycle.

2. Description of the Related Art

Human powered cycles come in many configurations. A bicycle, often referred to as a bike or cycle, is a human-powered, pedal-driven, single-track vehicle, having two wheels attached to a frame, one behind the other. A variation of the bicycle, the tricycle, often abbreviated to trike, is a human-powered (or gravity-powered) three-wheeled vehicle that is powered in a similar fashion to that of a conventional bicycle. The tricycle has become popular with those that have stability challenges as well as with the disabled. Generally, those people with a disability below the midsection use some form of hand crank to power the tricycle. Hand-crank tricycles use a hand-operated crank, either as a sole source of power, or as a dual-drive with foot-power from pedals and hand-power from the hand crank. The hand-power-only-tricycles can be used by individuals who do not have the use of their legs.

Others have suggested the use of linear-pull/push hand-cycles to allow a user with limited strength in their lower body to utilize their upper body to power the cycle, as the upper body's chest and back muscles are more powerful than the arm muscles utilized in traditional hand-crank tricycles. Some linear-pull cycles utilize only a push or pull stroke to cause the cycle to drive forwards. However, together, both strokes combined provide more power. Therefore, a need exists to utilize both strokes to power a hand-cycle to improve efficiency and allow more power to drive the cycle. The current design is the first handcycle to utilize a linear or vertically free push-pull motion, instead of an arc motion set about a fixed point of rotation. In addition, the present invention is simpler and therefore potentially lighter and less demanding of maintenance than other push-pull handcycles, the stroke length is freely adjustable, and the gear ratios can be set independently for the push and pull strokes. Furthermore, able-bodied cyclists can use a bicycle version with a sliding seat or a sliding footrest for a full-body workout.

BRIEF SUMMARY OF THE INVENTION

In view of the foregoing disadvantages inherent in the known hand powered cycles art, the present invention provides a novel rack-driven seated handcycle. The general purpose of the present invention, which will be described subsequently in greater detail, is to provide ease of operation while using the core back, chest, and abdominal muscles, which are stronger than the arm muscles used in traditional crack-powered handcycles. For able-bodied users, this can be combined with a sliding seat or a sliding footrest to incorporate leg muscles as well, leading to a full-body workout.

The rack-driven seated hand-cycle may have at least two wheels adapted to support and mobilize the rack-driven seated hand-cycle which are coupled to a frame having a beam and a seat slideably or non-slideably mounted upon the beam that is adapted to support a user. At least one handle is coupled to a first rack that is adapted to be grasped by at least one hand of the user. The handle is preferably fixedly coupled to the first rack such that movements of the handle directly correspond with movements of the rack. The first rack may comprise a first longitudinal side having a first set of teeth, and a first axle mounted to the frame and having a first pinion mounted to the first axle. The first pinion is adapted for communication with the first set of teeth and the first axle is turned via the longitudinal movement of the first rack. A first sprocket is mounted to the first axle that is also coupled to a first chain and to a first ratchet.

The rack-driven handcycle further may have a second axle mounted to the frame that has a second pinion mounted to the second axle. The second pinion is adapted for communication with the first rack such that the second axle is turned via the longitudinal movement of the first rack. The first rack comprises a second set of teeth on the second longitudinal side that is in communication with the second pinion. The first and the second longitudinal sides form opposite sides of the first rack. A second sprocket is coupled to a second chain that is also coupled to a second ratchet. The first and second ratchets are coupled to one of the wheels such that they both provide forward drive torque to at least one of the wheels. There may be a first and a second cogset with the first ratchet coupled to the first cogset and the second ratchet coupled to the second cogset.

Brakes and gear shifters are supplied just as with the standard convenience and safety features of most cycles and preferably are mounted in locations that allow hand operation, though different embodiments may have them located for foot operation or a combination of foot and hand operation. In a preferred embodiment, the rack-driven handcycle may have a first and second gear shifter coupled to the handle(s).

The wheels and the beam are substantially parallel to each other with the seat being slidably or non-slidably mounted onto the beam. The first rack and the beam each have a longitudinal axis such that the first rack longitudinal axis is substantially parallel to the beam longitudinal axis and the first beam longitudinal axis may be sloped in relation to the first rack longitudinal axis. The rack is preferably positioned substantially parallel to the ground surface. There may also be a drive-mount frame supporting the first axle via a roller bearing bracket. The drive-mount frame is mounted onto the frame via the steering axle to allow for azimuthally directed steering. The first rack is coupled with the first wheel to provide drive power to the wheel. There may be a second rack that is coupled to a second wheel. The second rack may also be coupled with a second handle that is adapted to be grasped by the other hand of the user.

The rack-driven handcycle may have alternative embodiments having two wheels, three wheels, or four wheels. In the three wheel embodiment, the first and second wheels are arranged opposite one another to share a first rotation axis. The third wheel comprises a second rotation axis arranged to offset the first rotation axis. In this embodiment, the first rack and the second rack are independently coupled to the frame.

Differential drive power provided to the first and second racks provides for steering. The first rack has a longitudinal axis and the beam has a longitudinal axis with the first rack longitudinal axis being substantially parallel with the beam longitudinal axis.

A method of providing drive power to the handcycle may comprise the steps of pulling a toothed rack to drive a first cog-set that is coupled to the first wheel, and pushing the toothed rack to drive a second cogset that is coupled to the first wheel. The method further may comprise the steps of steering the handcycle by turning the toothed rack azimuthally (or horizontally) to turn the wheel axis. The step of turning the rack azimuthally is for the basic version. The step of pushing/pulling the rack is for the differential drive version. The first and second wheels share a common axis. The method may also have the step of steering the handcycle by providing differential drive power in the steps of pushing and pulling the second toothed rack. The first cogset is set to a first gear setting and the second cogset is set to a second gear setting. The step of pulling moves the slidably mounted seat in the direction of the pulling and may be provided by at least one hand while pressing a foothold with at least one foot. Additionally, some embodiments may use a freely rotating rack that can rotate vertically along an axis created by the pinion (preferably tangential to the pinion) to allow the handle (bar)s to rotate vertically to allow the user to determine the height and direction of the rack movement. Two separate racks may each be paired in vertical adjustment, or rotate freely vertically relative one another. Racks may be limited in vertical movement by guides.

In another embodiment, the seat is fixed in place, and the footrest is slidably mounted to the frame. The footrest is rigidly connected to another rack (or to a chain), which meshes with a pinion (or sprocket in the case of a chain) on the rear wheel axis. This pinion (or sprocket in case of a chain) is ratcheted to only provide drive power in the forward direction so that the step of pushing the footrest forward provides drive power, while the step of pulling the footrest back is ratcheted. Therefore this embodiment has forward power applied to the front wheel via the hand-driven push-pull mechanism described above, while forward power is applied to the rear wheel by pushing of the footrest.

The present invention holds significant improvements and serves as a rack-driven seated handcycle. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The figures which accompany the written portion of this specification illustrate embodiments and method(s) of use for the present invention, rack-driven seated handcycle, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a hand powered cycle and more particularly to a rack-driven seated handcycle as used to improve the ease of use and versatility of operation while drawing on the power of stronger muscles than used by traditional crank-driven handcycles.

Figure 1:
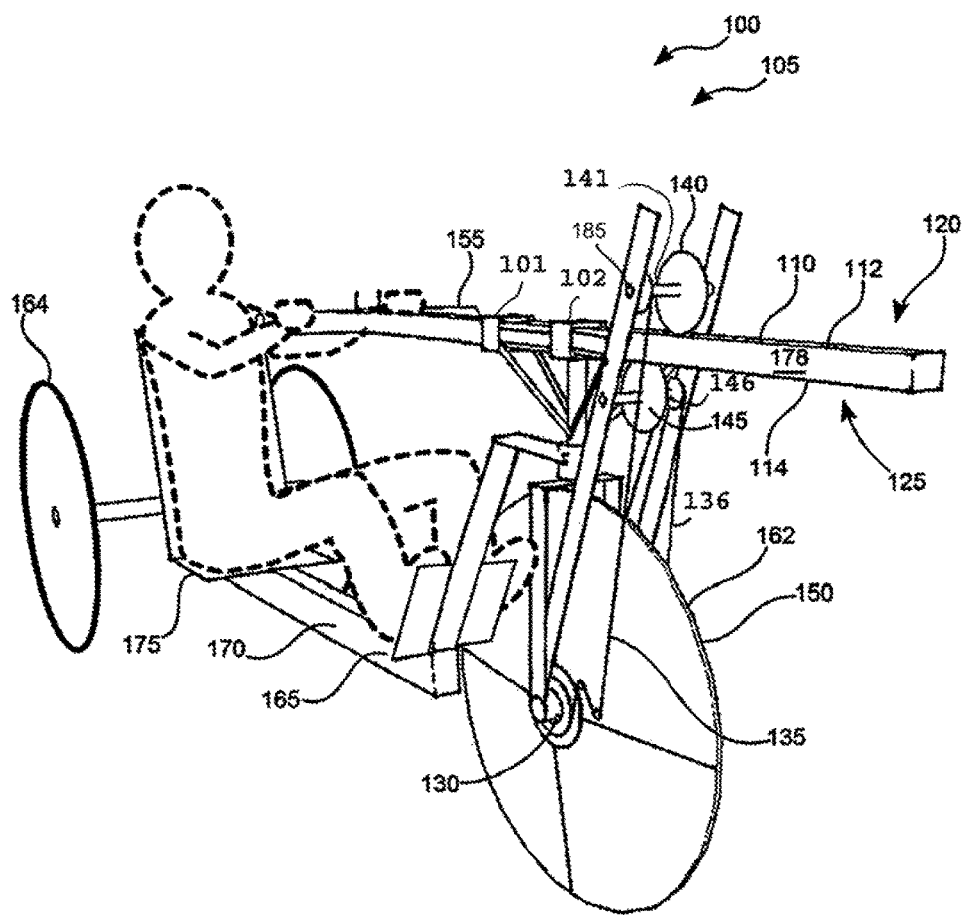
FIG. 1 shows a perspective view illustrating a rack-driven seated handcycle according to an embodiment of the present invention.

In greater detail now, referring to the drawings by numerals of reference there is shown in FIG. 1, a perspective view illustrating a first embodiment of rack-driven seated handcycle 100 according to an embodiment of the present invention.

Rack-driven seated handcycle 100 is a semi-recumbent style two, three, or four wheeled human powered cycle 105 that uses a linearly designed toothed rack 110 with at least one first teeth set 120 located on topside 112. Bottom side 114 of toothed rack 110 may or may not include a set of teeth, and here includes second teeth set 125 (hidden). Pinion 140 meshes with first teeth set 120 and pinion 145 that mesh with second teeth set 125. Pinions 140 and 145 may mounted on first pinion axis 141 and second pinion axis 146, respectively, and ratcheted to allow flow in opposing directions to properly drive chains 135 and 136 to in turn drive wheel 150 in a single direction given the back-and-forth movement of rack 110. Note that pinion 140 is rigidly connected to sprocket 200 via a first axle 185, and chain 135 connects to the sprocket. Likewise, second lower pinion 145 is rigidly connected to sprocket 210 via axle 225, and chain 136 connects to this sprocket. For each pinion-sprocket set, the ratio of pinion diameter to sprocket diameter can be configured by the user, but a ratio of about two-and-a-half will mimic the mechanical advantage built into standard touring/mountain bicycle cranks and front chainrings, and will allow standard touring bicycle cogsets to be used in gearing ratcheting mechanism or cogset 130 and its counterpart on the other side of wheel 150 as long as wheel 150 is of standard touring hike size (wheels of other sizes will require other pinion/sprocket ratios and cogset gear sizes).

In an alternative to ratcheting pinions 140 and 145, the cogsets 130 and 245 may be ratcheted; however it is unnecessary to ratchet both the cogsets and the pinions. Either set of ratchets is useful. At least one chain 135 couples the upper sprocket 200 and second chain 136 couples with lower sprocket 210 with drive wheel 150 which may be located in front or back of the rider, here shown in front. The rider pushes and pulls the handlebars 155 forward and rearward through aligned front and rear guides 102 and 101 to pull the rack back and forth in relation to the stationary but rotatable meshing pinion(s) 140 and 145 above and below toothed rack 110 to propel cycle 105 forward. When both first and second set of teeth are provided, each forward and each rearward stroke constitutes a power stroke that propels cycle 105.

A plurality of gear speeds may independently be selected (on cogset 130 and its counterpart on the other side of the wheel) to provide a specific lever ratio for each of the forward and the rearward strokes at the pinion along the pinion axes. The lever ratio may be adjusted for each of the pinions to provide for varied gear ratio on the pull and push axis, for instance, if the forward stroke is provided by power of the pectoral, deltoid, and abdominal muscles, and the rearward stroke is powered by the upper and lower back as well as the biceps, the varied power abled to be supplied by any user may vary by stroke.

Figure 1A:
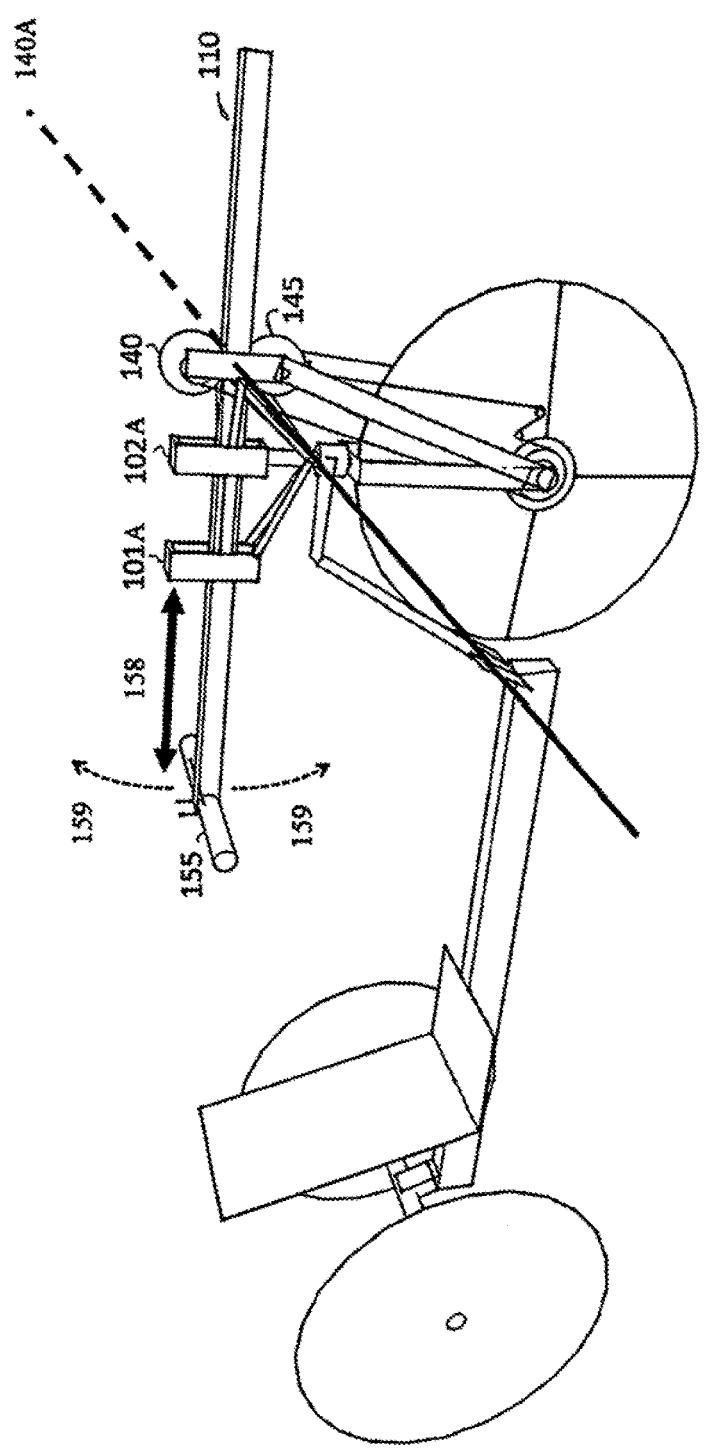
FIG. 1A shows a side perspective view illustrating a rack-driven seated handcycle according to an alternative embodiment of the present invention.

As can be seen in FIG. 1A, the basic push-pull motion of the rack is linear (along path 158), but the handlebar 155 can move freely upward and downward (along dashed line 159), as the only location at which rack 110 is pinned with respect to the axis transverse to the handcycle is between the two pinions 140 and 145. If the handlebar is adjusted downward, rack 110 rotates counterclockwise along axis 140A (viewed as three-dimensional perpendicular through rack) by pushing the handles down to vertically rotate the rack counterclockwise. If the vertical rotation of the rack is too extreme, the ends of the brackets will be occluded by the frame or other parts of the handcycle, however, the practical desired range of motion is expected to be less than thirty degrees in either direction for ergonomic purposes. Similarly, the rack may be rotated by pushing up on the handles to rotate rack clockwise (in the perspective of this side perspective view). In this configuration, vertically elongated rack guides 101A and 102A accommodate vertical motion of rack along 159. Elongated rack guides 101A and 102A may each include a pair of cylindrical roller bearings with axes aligned vertically, with the rack passing between each pair. The bearings providing guidance to the rack therethrough along the sides of the guides (leaving top and bottom of rack free (unsupported when placed in center of elongated guides). The rack can then slide upward and downward freely within guides using a pivot point between the two pinions. Handles move up and down as track is rotated vertically about pinion tangential axis. In this way, the cyclist has the greatest flexibility to activate desired muscles with the most comfort. In some embodiments, no guides are used to allow for maximum vertical rotation. For the cyclist to rest without having to support the rack vertically, guides 101 and 102 may include roller bearings under the rack as well. These roller bearings rotate along the axis transverse to the cycle, and support the push-pull motion of the rack at the lowest point in the desired motion.

Figures 2, 2A:
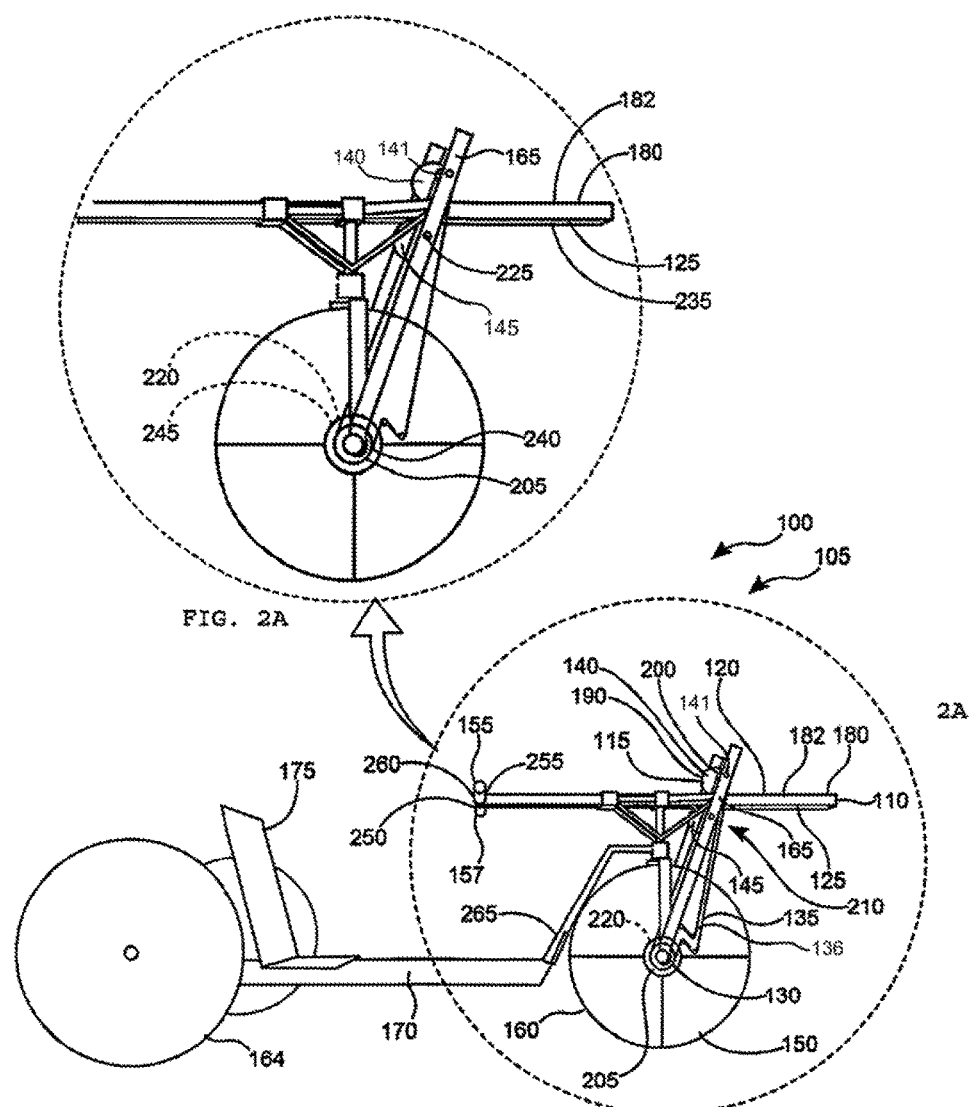
FIG. 2 is a side elevation view.
FIG. 2A is a magnified view of circle 2A in FIG. 2.

Referring now to FIGS. 2 & 2A, rack-driven seated handcycle 100 may have at least two wheels 160 and 164 adapted to support and mobilize rack-driven seated handcycle 100. Wheels are coupled to frame 165 along with beam 170 and seat 175. At least one handle 157 is coupled to first rack 180 that is adapted to be grasped by at least one hand of the user. First rack 180 may comprise first longitudinal side 182 having first teeth set 120. First axle 185 mounted to frame 165 includes first pinion 140 mounted on first axle 185. First pinion 140 may be adapted for communication with first teeth set 120 to rotate over first axle 185 to translate the longitudinal movement of first rack 180 into rotational movement. First sprocket 200 is mounted to first axle 185 that is also coupled to first chain 135 and to first ratchet 205. Second sprocket 210 is coupled to second chain 136 that is also coupled to second ratchet 220. First 205 and second ratchet 220 are coupled to drive wheel 150 such that they are arranged for rotation opposite one another for providing forward drive power to at least one of drive wheels 150.

Rack-driven seated handcycle 100 may have second axle 225 mounted to frame 165 that has second lower pinion 145 mounted to second axle 225. Second pinion 145 is adapted for communication with first rack 180 such that second axle 225 is turned via the longitudinal movement of first rack 180. First rack 180 comprises second teeth set 125 on second longitudinal side 235 that is in communication with second pinion 145. First 182 and second longitudinal side 235 form opposite sides of first rack 180. There may be first cogset 130 and second cogset 245 with first ratchet 205 coupled to first cogset 130 and second ratchet 220 coupled to second cogset 245. (Second cogset 245 shown in FIG. 3 on opposite side of first cogset 130.)

Brake(s) handle 255 and gear shifters 250 and 260 are supplied on handle 157 as is known in the art for safety features of most cycle(s). Brakes and shifter are mounted in locations that allow hand operation, though different embodiments may have them located for foot operation (265) or a combination of foot (265) and hand (250) operation. In a preferred embodiment, rack-driven seated handcycle 100 may have first 250 and second gear shifter 260 coupled to handle(s) 157. Gear shifters 250 and 260 are provided on respective handles for each of the two racks. The shape of handlebar 155 itself may be a simple straight bar, or it may include vertical, inclined, or rotatable bar ends to allow variation of hand grip during the ride.

Figure 3:
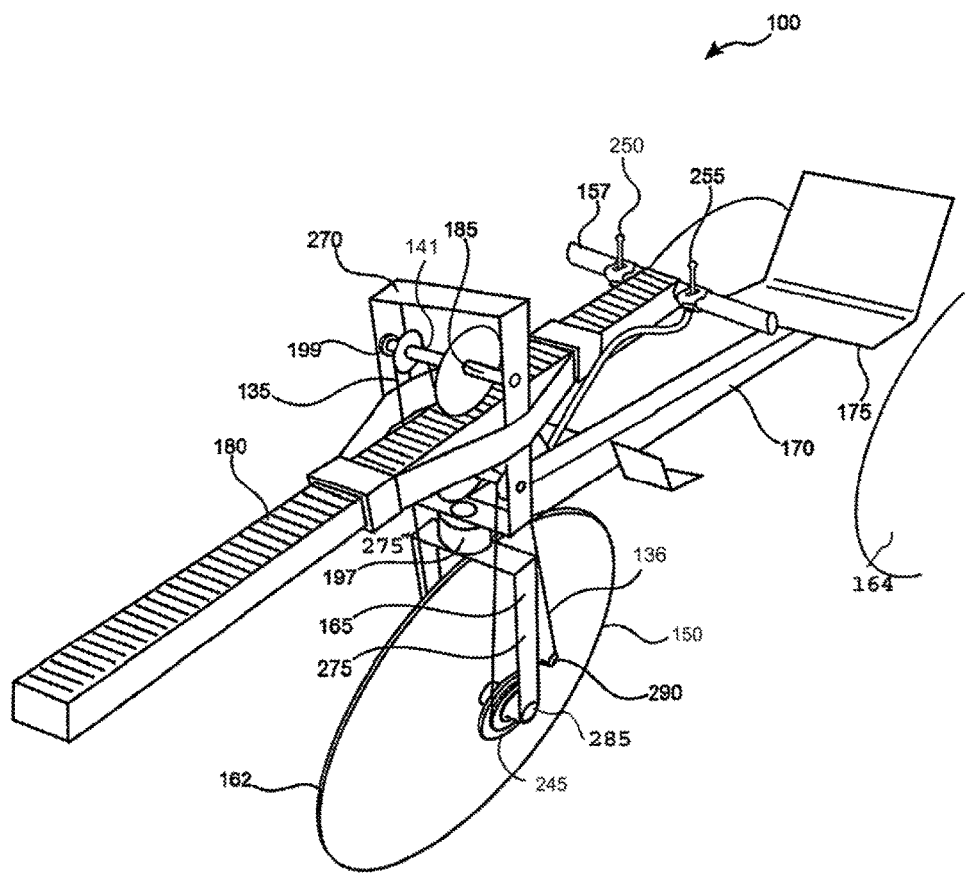
FIG. 3 is a perspective view illustrating a front drive embodiment of the rack-driven seated handcycle having a sloped beam according to an embodiment of the present invention.

Referring now to FIG. 3, wheel(s) 160 and beam 170 reside along a substantially parallel plane with seat 175 being slidably mounted onto beam 170 to move forward and backwards or lock into modified positions based on height of user. First rack 180 and beam 170 each have a longitudinal axis such that first rack 180 longitudinal axis is substantially parallel to beam 170 longitudinal axis and beam 170 longitudinal axis and first rack 180 horizontal axis are deposed substantially parallel in relation to the ground surface. There may also be drive-mount frame 270 supporting first axle 185 via roller bearing bracket 199. Drive-mount frame 270 is mounted onto and above frame 165 via steering axle 197 and wheel mount fork 275 of first wheel 162 are attached to drive-mount frame 270 via roller bearing bracket 199 below frame 165 via steering axle 197 such that the assembly is substantially vertically aligned and able to rotate on the vertical longitudinal axis to allow for azimuthally directed steering by pushing handle(s) 157 to the left or to the right to rotate wheel along steering axis on steering axle 197, steering axle may include a roller bearing bracket. Similarly, guides 101 and 102 may be vertically elongated to allow vertical movement of the rack along pinion created tangential axis, this axis being horizontal and perpendicular to forward motion (or, otherwise stated, parallel wheel axis).

This embodiment preferably has a three-wheel (with wheels 160) arrangement for stability as a tricycle with two rear wheel(s) 164 and 166 rotatably attached to rear wheel axle 280 and front wheel axle 285 rotatably attached to the front wheel mount fork 275. First rack 180 is coplanar with first front wheel 162 and is coupled with first wheel 162 to provide drive power via a chain or belt. Derailleur 290 may take up slack and allow for changing gear speeds. Derailer 290 may be mounted forward of first wheel axis. However, in some embodiments, derailer may be mounted behind first wheel axis. There may be a second rack (not shown) that is coupled to second wheel 164. Second rack may also be coupled with second handle (not shown) that is adapted to be grasped by another hand of the user.

First gear shifter 250, as well as hand brake(s) 255, may be mounted to the handle(s) 157. There may be only one hand brake(s) 255. An alternative embodiment may also have a second wheel brake operators adapted to be operated by a foot of the user.

Figure 4:
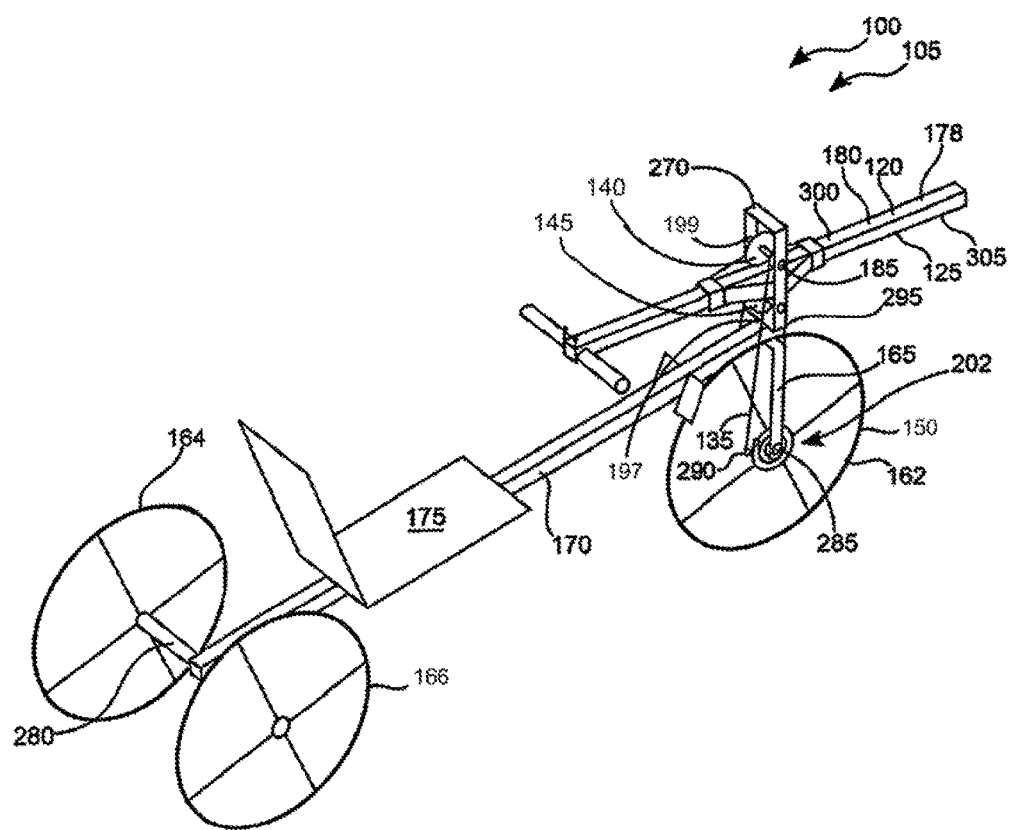
FIG. 4 is a top rear perspective view illustrating an embodiment of the rack-driven seated handcycle having a fixed or sliding seat according to an embodiment of the present invention.

Referring now to FIG. 4, wheel(s) 160 and beam 170 are also substantially parallel to each other with seat 175 mounted onto beam 170. Beam 170 may include upward or downward slope from rear wheel axle 280 to front frame mount. The beam's longitudinal axis is sloped downwardly from front attachment point 295, in relation to longitudinal axis of first rack 180. First rack 180 is preferably positioned substantially parallel to the ground surface. In this embodiment, drive-mount frame 270 also supports first axle 185 via steering axle 197. Drive-mount frame 270 is mounted onto frame 165 via steering axle 197 to allow for azimuthally directed steering and first rack 180 is coupled with first wheel 162 to provide drive power. Derailleur 290 in this embodiment is located forward of front wheel axle 285 for taking up first chain 135 slack for the different diameters of sprocket(s) 202 associated with each gear speed range. Derailleur 290 may be mounted such that it is behind front wheel axle 285 in a variation of this embodiment with drive-mount frame 270 relocated accordingly.

Figure 7:
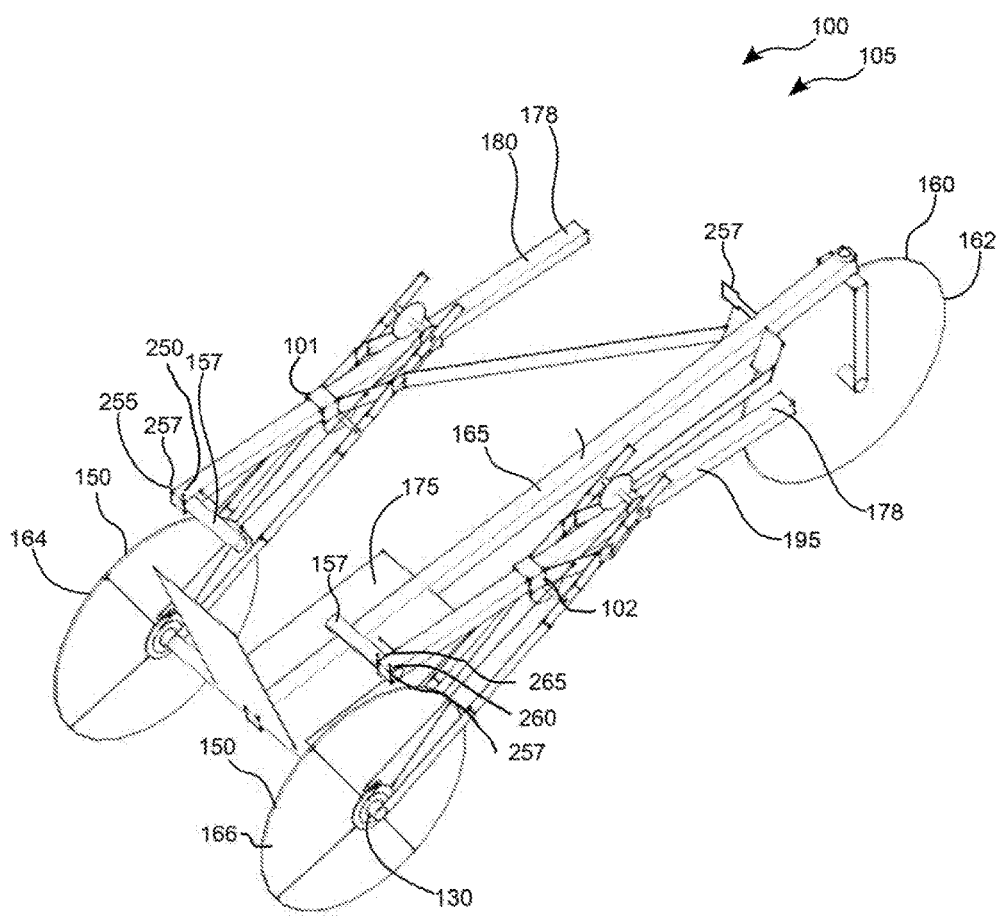
FIG. 7 is a top perspective view of an alternative embodiment of the present invention.
Figure 8:
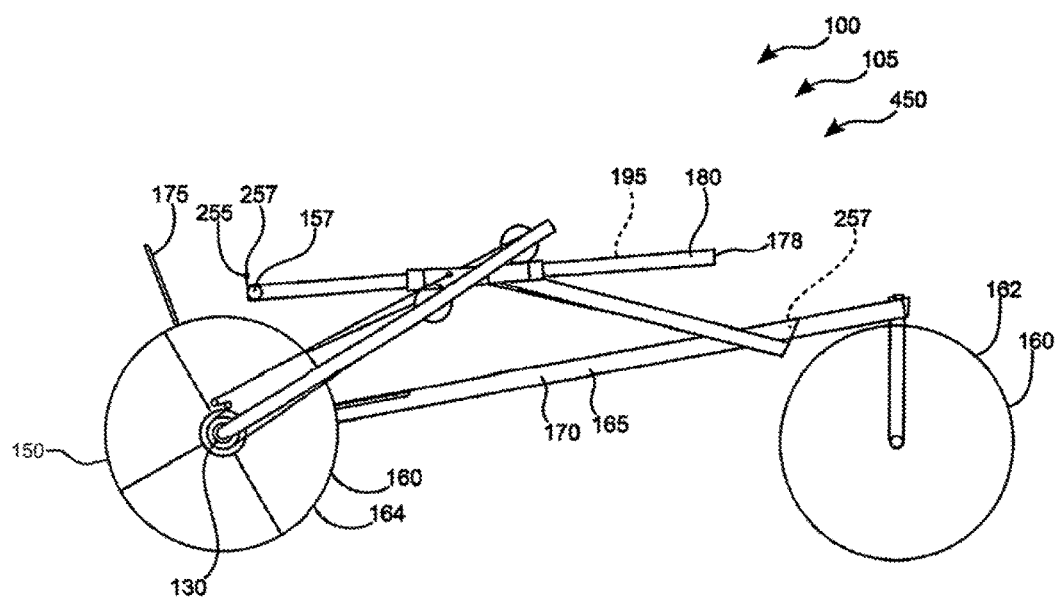
FIG. 8 is a side view of an alternative embodiment of the present invention.

In yet another variation of this embodiment, referring to FIGS. 7-8, there may be second rack 195 that is coupled to second wheel 164 in this embodiment also and second rack 195 may be coupled to second handle 153 for grasping by the other hand of the user which may provide forward motion of cycle(s) 105 with both first rack 180 and second rack 195 operating in opposition to each other or by operating in unison with each other. In such an embodiment, pinions can be mounted to separate racks. A user grips each handle and pushes and pulls with each hand to move first rack 180 and second rack 195 forward and backward. In a single rack 178 embodiment, power may be supplied to the associated wheel(s) 160 in the forward with wheel(s) 160 free-wheeling during the stroke opposite the power stroke. In an alternative embodiment, a reverse mechanism can allow the power to drive in the reverse direction. A single rack 178 embodiment may also provide power with both directions of movement of rack 178 with first teeth set 120 located on top side 300 of rack 178 and second teeth set 125 located on bottom side 305 of rack 178, and first pinion 140 and second pinion 145 in communication with first teeth set 120 and second teeth set 125, respectively.

Figure 5:
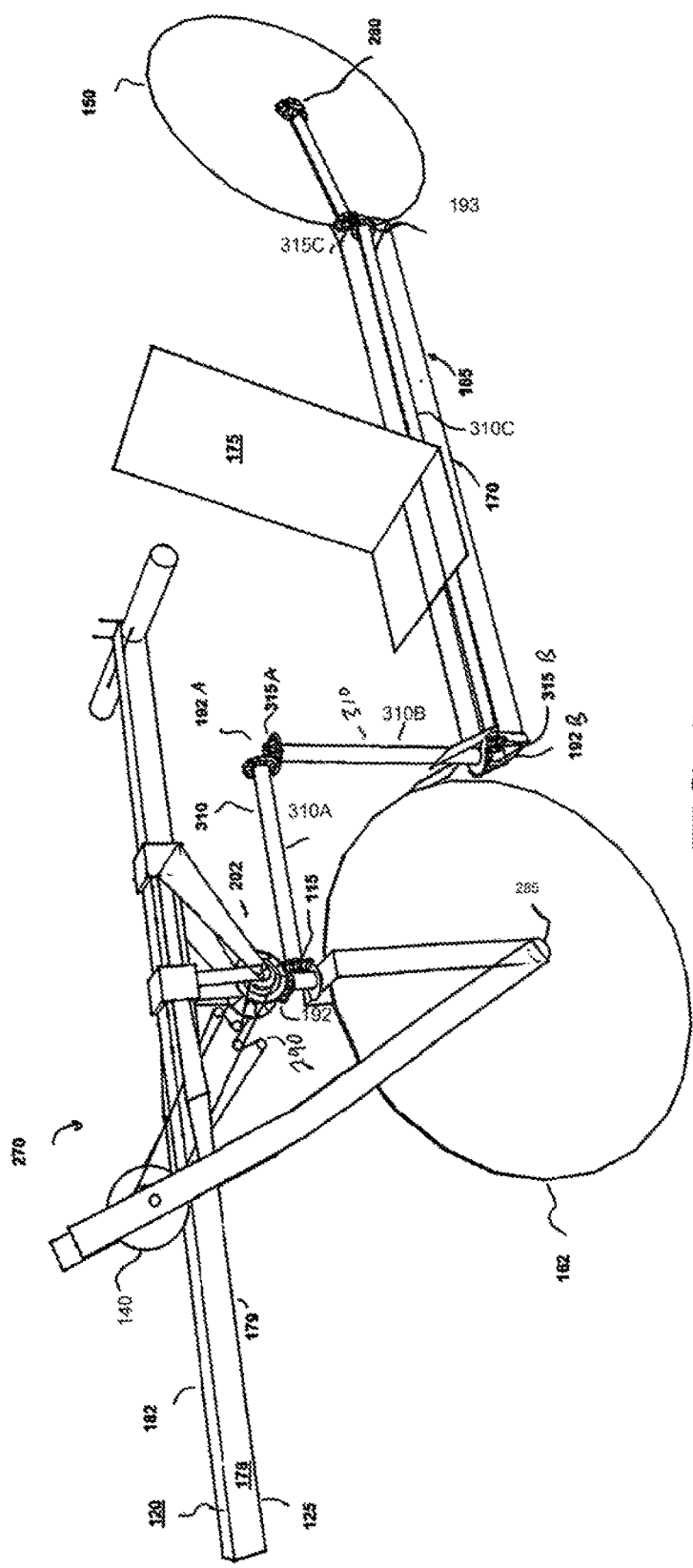
FIG. 5 is a perspective view illustrating a gear driven rear drive embodiment of the present invention.
Figure 5A:
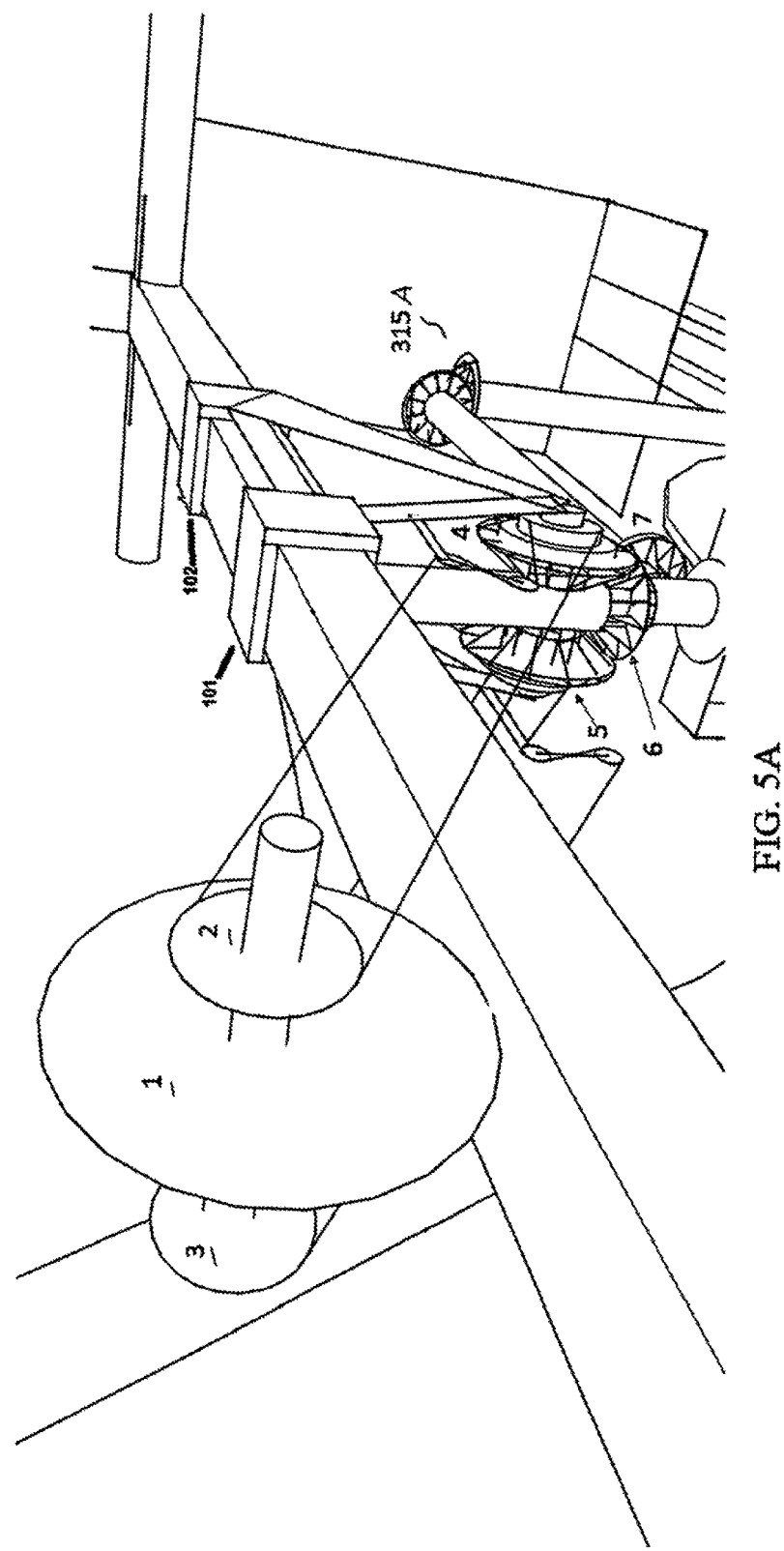
FIG. 5A is a magnified partially cut away view of the drive and cogset of an embodiment as shown FIG. 5.

The rear wheel drive realization is more complex because the rack and pinion drive mechanism pivots when turning, but the rear wheel remains straight. Therefore a chain connection between the drive mechanism and rear wheel is difficult, though a flexible chain and chain-guide would work. Another solution is the use of bevel gears (as in standard chainless shaft-driven bicycles), as shown in FIG. 5 and with a closeup in FIG. 5A. We now refer to the numbering shown in FIG. 5A. Pinion 1 on the top of a single-sided rack drives one axle rigidly connected to sprocket 2 and sprocket 3. Sprocket 2 is connected by chain and derailleur to ratcheted cogset 4, and sprocket 3 is connected by chain and derailleur to ratcheted cogset 5. Rack moves within guides 101 and 102.

During the pull stroke, pinion 3 powers cogset 5, which torques vertical-axis gear 6 clockwise (viewed from above), providing forward power to the drivetrain and rear wheel. During the pull stroke, cogset 4 ratchets. During the push stroke, pinion 2 powers cogset 4, which torques vertical-axis gear 6 clockwise (viewed from above), providing forward power to the drivetrain and rear wheel. During the push stroke, cogset 5 ratchets. The vertical-axis gear 6 spins freely with respect to the handlebar stem, so as to allow steering. Vertical gear 6 is then connected via a bevel gear 7 to a driveshaft which runs through or along the frame to the rear wheel. The motion I transferred along angle drive 315A.

Figure 6:
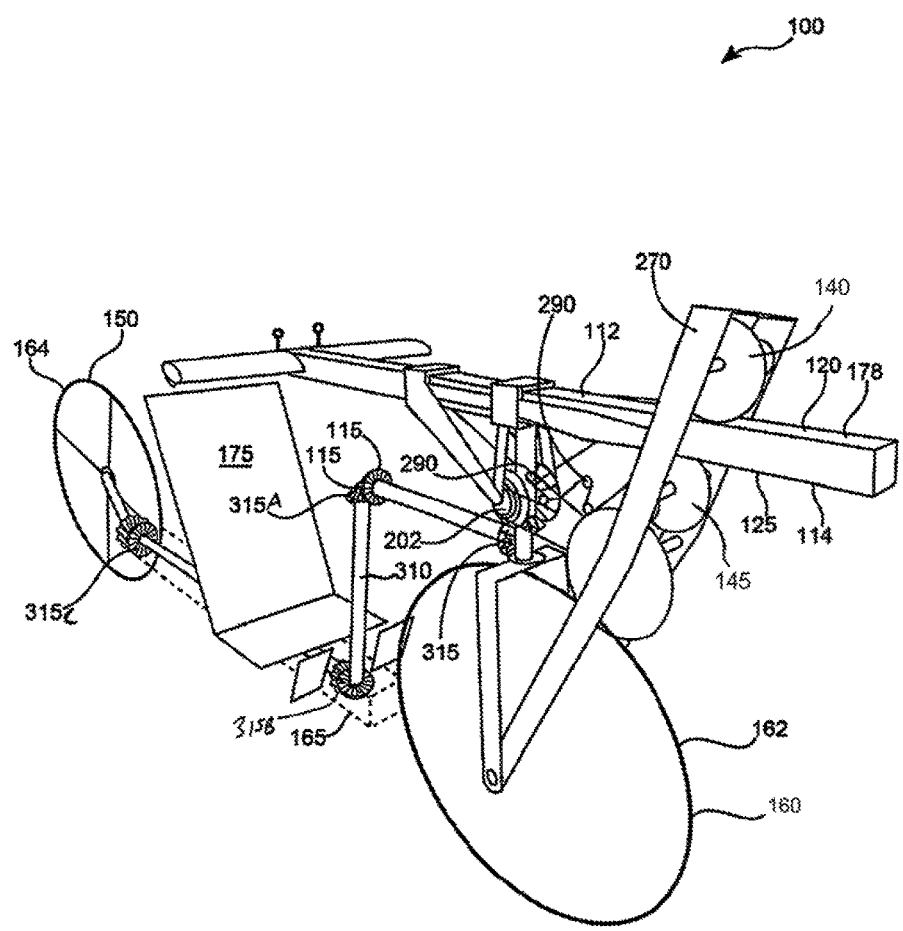
FIG. 6 is a perspective view of an embodiment of the present invention.

Refer now to FIG. 5, the power is transferred to drive wheel 150 via drive shaft 310 instead of a chain or a drive belt. Dual forty-five degree angled pinions 192 are in mesh to form right angle drive 315. Pinions 192 may be twenty-two-and-a-half degree pinions 192 in mesh to form a forty-five degree angle drive, or forty-five degree pinions for a ninety degree angle drive, in every location where drive shaft 310 forms an angle until the final drive shaft 310 (lower horizontal bar along frame 165) is in communication with final right angle drive 315 along located at drive wheel 150 in rear. Another embodiment may use a chain drive between gear 115 and rear wheel 164. Yet another embodiment may use fewer bevel gear connections by displacing the drive shaft to either side of the rider and heading directly to the rear wheel instead of following the cycle frame. Rack 178 may have first teeth set 120 on first longitudinal side 182 and first pinion 140 in mesh with first teeth set 120. Optionally same rack 178 may have second teeth set 125 on lower longitudinal side 179 (here lower pinion drive to mate with lower teeth not used or shown). Drive shaft 310 in three distinct pieces 310A, 310B, and 310C powers a rear wheel axle 280. Derailleur 290 may be located above first wheel 162 and be in communication with sprocket(s) 202 of different diameters that are rigidly attached to one of gear(s) 115 of right angle drive 315A located just below rack 178. Two spaced horizontal gear(s) 115 facing each other are in communication with a vertically facing gear(s) 115 to form right angle drive 315A. Right angle dive 315A connects drive shaft 310A to drive shaft 310B and then translates rotation energy via drive angle 315B to lower horizontal drive shaft 310C to ultimately power drive wheel 280 via angle gear 193. Though not depicted in the figures, right angle drives 315 and drive shafts 310 are enclosed in cowling or within frame 165 to prevent the user from inadvertently becoming entangled in gear(s) 115. Seat 175 is rigidly or slidably mounted to beam 170 in this embodiment but may be adjusted in distance along beam 170 in relation to drive-mount frame 270. FIG. 6 shows a similar embodiment from the opposite side. They cycles of both FIG. 5 and FIG. 6 can have bicycle or tricycle configurations.

FIG. 7 is a perspective view illustrating a dual drive embodiment of rack-driven seated handcycle 100 having a slideable seat 175. In this three wheel(s) 160 embodiment, first wheel 162 and second wheel 164 are arranged opposite one another to share a first rotation axis. The third wheel(s) 160 comprises a second rotation axis arranged to offset the first rotation axis. The third wheel(s) 160 may be located in front of the rider and respond easily to differential power applied to first rack 180 and second rack 195 to steer the cycle(s) 105. In this embodiment, first rack 180 and second rack 195 are independently coupled to frame 165 and may provide a power stroke with first rack 180 and with second rack 195 operated either in unison or opposing. Ratchet mechanism 130 allows wheel(s) 160 to be powered with one direction movement of each rack 178 and to free-wheel when reciprocation is stopped. As with the previously mentioned embodiment, there may be independently controlled brakes applied to the rear wheel(s) 160 to assist steering. Wheel brake operators 257 may have controls mounted on each handle(s) 157 or may have a combination of foot wheel brake operators 257 and hand brake(s) 255. First rack 180 and beam 170 each have a longitudinal axis with first rack 180 longitudinal axis being substantially parallel with beam 170 longitudinal axis. The dual drive embodiment preferably comprises 3 wheel(s) 160 or 4 wheel(s) 160 for stability. For the sliding seat realization, beam 170 can be configured horizontal instead of sloped.

Referring to FIG. 7, rack-driven seated handcycle 100 may have alternate embodiments having two wheel(s), three wheel(s), or four wheel(s). In the three wheel(s) embodiment, third wheel 166 and second wheel 164 are arranged opposite one another to share a second rotation axis. The first wheel 162 comprises a first rotation axis arranged to offset the first rotation axis. In this embodiment, first rack 180 and second rack 195 are independently coupled to frame 165 and may provide a power stroke with first rack 180 and with second rack 195 operated either in unison or opposing. Ratchet mechanism 130 allows wheel(s) 160 to be powered with one direction of each rack 178 and to free-wheel when rack 178 reciprocation is stopped. Differential drive power of first rack 180 and second rack 195 is able to provide steering in a preferred embodiment but other embodiments having these features may also have other methods of steering such as independently controlled wheel brake operators 257. Wheel brake operators 257 may have controls mounted on each handle(s) 157 or may have a combination of foot wheel brake operators 257 and hand brake(s) 255. First rack 180 and beam 170 each have a longitudinal axis with first rack 180 longitudinal axis being substantially parallel with beam 170 longitudinal axis. The dual drive embodiment preferably comprises 3 wheel(s) 160 or 4 wheel(s) 160 for stability. For the sliding seat realization, beam 170 can be configured horizontal instead of sloped.

Rack-driven seated handcycle 100 may be sold completely assembled or as kit 450 comprising the following parts: at least one cycle(s) 105 frame 165; at least one first wheel 162; at least one second wheel 164; at least one seat 175 (with harness and seat stopper for users with a handicapped lower body); at least one first rack 180 and first pinion 140; at least one handle(s) 157; at least one accessory kit containing the remaining accessories for a fully operational cycle(s) 105; at least one set of assembly instructions, and at least one set of user instructions. The kit has instructions such that functional relationships are detailed in relation to the structure of the invention (such that the invention can be used, maintained, or the like in a preferred manner). Rack-driven seated handcycle 100 may be manufactured and provided for sale in a wide variety of sizes and shapes for a wide assortment of applications. An alternative kit may include only the front wheel and drive/steering mechanism, and exclude the seat and back wheels. This kit will include clamps that mount to a standard wheelchair for use as the seat and back wheels; such kits are already common for crank-powered hand-cycles. Systems may include vertical motion of rack within optionally vertically elongated rack guides. Each rack being independently vertically adjustable along pinion tangential axis. Otherwise, both racks may be vertically locked with one another to maintain same height.

Figure 9:
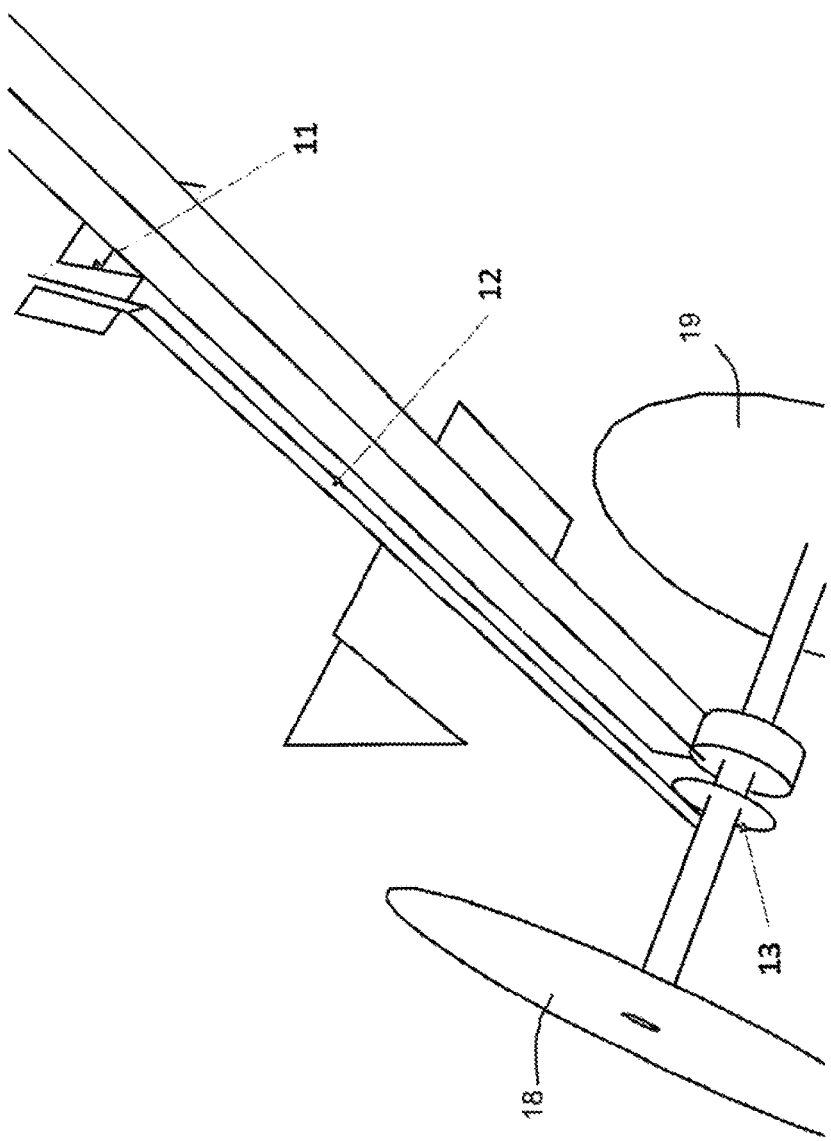
FIG. 9 shows an underside magnified view of the central portion of an embodiment of the present invention with a fixed seat and sliding footrest, to power the rear wheel.

As can be seen in FIG. 9, a fixed seat may be paired with sliding footrest 11. Sliding footrest 11 may be mounted onto a rack 12 to provide rear-wheel drive to rear wheels 18 and 19 via drive wheel 13. Thus, feet are moved forward and back to power the rear wheel. In an alternative embodiment, the drive wheel 13 can be ratcheted to allow only the push (or act of moving the sliding footrests forward) to translate into drive power, while the return (back) is disengaged and more freely returned to starting position (to allow for next forward stroke). Rear wheel drive may be powered by a rack/pinion, or otherwise standard chain drive mechanics.

In all shown realizations, the handcycle can only move forward, not backward. Backward motion of the wheels will cause the upper and lower pinions to push the rack in opposite direction, so no motion is possible. If the user wants to move the handcycle backward, they must either pull the rack all the way out of contact with the pinions, or push it all the way into the driveset to the end of the toothed portion of the rack. Then the rack and pinions are disengaged, and the user can push the handcycle backward with their hands or feet. Pushing or pulling the rack back into engagement with the pinions allows the user to resume normal operation. A better method of allowing backward-directed drive would be to incorporate a reversing ratchet mechanism (as is common on wrenches) on each of the ratcheted freewheels. For ease of operation, the reversing ratchet control could be attached to the handlebar (beside the brakes and gear shifters) by shifter cables.

A method of using rack-driven seated handcycle may comprise the steps of step one pulling handle(s) to drive first cogset that is coupled to first wheel, and pushing toothed rack to drive second cogset that is coupled to first wheel; step two steering rack-driven seated handcycle by turning toothed rack azimuthally to turn the wheel(s) axis. For the dual-drive version, step three pulling the second toothed rack to drive a third cogset coupled to the second wheel; step four pushing the second toothed rack to drive a fourth cogset that is coupled to second wheel. First wheel and second wheel share a common axis; and step five steering cycle(s) by providing differential drive power in the steps of pushing and pulling the second toothed rack. First cogset is set to a first gear(s) setting and second cogset is set to a second gear(s) setting. The step of pulling the handlebar moves the slidably mounted seat in the direction of the pulling and may be provided by at least one hand while pressing a foothold with at least one foot. The step of pushing the handlebar moves the slidably mounted seat in the direction of the pushing and may be provided by at least one hand, with the reaction force at the beginning of the push stroke being applied by the stopper at the end of the slidably mounted seat's range of motion, and the reaction force at the end of the push stroke being applied by pulling a foothold strap with at least one foot.

Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Those with ordinary skill in the art will now appreciate that upon reading this specification and by their understanding the art of recumbent style cycles as described herein, methods of the rack-driven seated handcycle will be understood by those knowledgeable in such art.

What is claimed is new and desired to be protected by Letters Patent is set forth in the appended claims:

1. A rack-driven seated handcycle comprising:
   a. at least two wheels adapted to support and mobilize said rack-driven seated handcycle, said at least two wheels coupled to a frame, said frame comprising a beam;
   b. a seat adapted to support a user, said seat mounted upon said beam;
   c. at least one handlebar directly fixedly mounted on a first rack, said at least one handlebar adapted to be grasped by at least one hand of the user;
   d. the first rack comprising a first longitudinal side, said first longitudinal side comprising a first set of teeth;
   e. a first axle mounted to said frame, said axle comprising a first pinion mounted to said first axle, said first pinion adapted for communication with said first set of teeth; wherein said first axle is turned via a longitudinal movement of said first rack;
   f. a first sprocket mounted to said first axle, said first sprocket coupled to a first chain, said first chain coupled to a first ratchet;
   g. a second sprocket coupled to a second chain, said second chain coupled to a second ratchet;
   h. wherein said first and second ratchets coupled to at least one of said at least two wheels, said first and second ratchets arranged for rotation opposite one another for provision of drive power to at least one of said at least two wheels.

2. The rack-driven handcycle of claim 1 further comprising a second axle mounted to said frame, said second axle comprising a second pinion mounted to said second axle, said second pinion adapted for communication with said first rack; wherein said second axle is turned via the longitudinal movement of said first rack.

3. The rack-driven handcycle of claim 2 wherein said first rack comprises a second set of teeth on a second longitudinal side, whereby said second pinion adapted for communication with said second set of teeth.

4. The rack-driven handcycle of claim 3 wherein said first and said second longitudinal sides form opposite sides of said first rack.

5. The rack-driven handcycle of claim 1 further comprising a first and second cogset, wherein said first ratchet is coupled to the first cogset, and said second ratchet is coupled to the second cogset.

6. The rack-driven handcycle of claim 5 further comprising a first and second gear shifter coupled to said at least one handlebar.

7. The rack-driven handcycle of claim 1 wherein said at least two wheels and said beam are substantially parallel, and wherein said seat is slidably mounted on said beam.

8. The rack-driven handcycle of claim 7 wherein said first rack comprises a longitudinal axis and said beam comprises a longitudinal axis, said first rack longitudinal axis being substantially parallel with said beam longitudinal axis.

9. The rack-driven handcycle of claim 7 wherein said first rack comprises a longitudinal axis and said beam comprises a longitudinal axis, said beam longitudinal axis being sloped or parallel in relation to said first rack longitudinal axis.

10. The rack-driven handcycle of claim 1 further comprising a drive-mount frame supporting said first axle, and a roller bearing bracket, wherein said drive-mount frame is mounted onto said frame coupled to said at least two wheels via steering axle to allow for azimuthally directed steering.

11. The rack-driven handcycle of claim 1 wherein said first rack is substantially parallel with a ground surface.

12. The rack-driven handcycle of claim 1 wherein said first rack is coupled with a first wheel of said at least two wheels to provide drive power to said first wheel, and further comprising:
   a. a second rack, wherein said second rack is coupled to a second wheel of said at least two wheels; wherein said second rack comprises a second handlebar coupled to said second rack, said second handlebar adapted to be grasped by the other hand of said at least one hand of the user.

13. The rack-driven handcycle of claim 12 further comprising:
   a. at least a third wheel;
   b. wherein said first and second wheels are arranged opposite one another to share a first rotation axis;
   c. wherein said third wheel comprises a second rotation axis arranged offset said first rotation axis.

14. The rack-driven handcycle of claim 13 wherein said first rack and said second rack are independently coupled to said frame; wherein differential drive power provided to said first and second racks provides for steering.

15. The rack-driven handcycle of claim 12 wherein said first rack comprises a longitudinal axis and said beam comprises a longitudinal axis, said first rack longitudinal axis being substantially parallel with said beam longitudinal axis.

16. A method of providing drive power to a handcycle comprising the steps of:
   a. pulling a handlebar directly fixedly mounted on a toothed rack in a linear or vertically adjustable motion to cause motion of the toothed rack to drive a first cogset coupled to a first wheel;
   b. pushing the handle bar in the linear or vertically adjustable motion to cause motion of the toothed rack to drive a second cogset coupled to the first wheel c. steering the handcycle is provided by movement of the toothed rack.

17. The method of claim 16 further comprising the step of steering the handcycle is provided by turning the toothed rack azimuthally relative to a user in order to turn a wheel axis.

18. The method of claim 16 further comprising steps of:
   a. pulling a second toothed rack to drive a third cogset coupled to a second wheel;
   b. pushing the second toothed rack to drive a fourth cogset coupled to the second wheel;
   c. wherein the first and second wheels share a common axis.

19. The method of claim 18 further comprising the step of steering the handcycle is provided by providing differential drive power in the steps of pushing and pulling the second toothed rack from the drive power providing in the steps of pushing and pulling the first toothed rack.

20. The method of claim 16 wherein said step of pulling includes using at least one arm of a user to pull the toothed rack while maintaining a relative distance between the rack and the at least one arm.

21. The method of claim 16 wherein the step of pulling is provided by at least one hand of a user, and further comprising the concomitant step of pressing a foothold with at least one foot of a user.

22. The method of claim 21 wherein said concomitant step of pressing the foothold acts to move a slidably mounted seat, thereby lengthening a stroke length.

23. The method of claim 16, further comprising a concomitant step of applying a reaction force to a seat harness.

24. The method of claim 23, wherein said step of pulling causes said reaction force on a fixed-position-seat.

25. A rack-driven seated handcycle comprising:
   a. at least two wheels adapted to support and mobilize said rack-driven seated handcycle, said at least two wheels coupled to a frame, said frame comprising a beam;
   b. a seat adapted to support a user, said seat mounted upon said beam;
   c. at least one handlebar directly fixedly mounted on a first rack, said at least one handle adapted to be grasped by at least one hand of the user;
   d. first rack comprising a first longitudinal side, said first longitudinal side comprising a first set of teeth;
   e. a first axle mounted to said frame, said axle comprising a first pinion mounted to said first axle, said first pinion adapted for communication with said first set of teeth; wherein said first axle is turned via the longitudinal movement of said first rack; and
   f. a first sprocket mounted to said first axle, said first sprocket coupled to a first chain, said first chain coupled to a first ratchet.

\* \* \* \* \*